United States Patent [19]

Fischer

[11] 4,212,527
[45] Jul. 15, 1980

[54] PHOTOGRAPHIC FILM ASSEMBLAGE

[75] Inventor: Richard V. Fischer, West Warwick, R.I.

[73] Assignee: Polaroid Corporation, Cambridge, Mass.

[21] Appl. No.: 969,997

[22] Filed: Dec. 15, 1978

[51] Int. Cl.² ............................................. G03B 17/26
[52] U.S. Cl. .................................................. 354/275
[58] Field of Search ......................... 96/76 C, 78, 201; 242/71.1, 71.6, 71.7; 354/214, 275; 352/232, 233, 241

[56] References Cited

U.S. PATENT DOCUMENTS

| 3,200,726 | 8/1965 | Land . | |
| 3,270,642 | 9/1966 | Nerwin . | |
| 3,350,990 | 11/1967 | Finelli et al. . | |
| 3,508,820 | 4/1970 | Tsunoda | 352/241 X |
| 3,684,206 | 8/1972 | Edwards | 96/78 X |
| 3,852,780 | 12/1974 | Augustin et al. | 354/86 |
| 3,894,871 | 7/1975 | Land | 96/3 |
| 4,145,133 | 3/1979 | Wareham | 354/275 |

FOREIGN PATENT DOCUMENTS 1121255  7/1968  United Kingdom ...................... 96/201

Primary Examiner—John Gonzales
Attorney, Agent, or Firm—Alfred E. Corrigan

[57] ABSTRACT

A photographic film assemblage including a roll of self-developing or instant type film for use in a conventional still type camera of the non-self-developing or non-instant type. The film assemblage includes a cylindrical housing for holding the roll of film. The exterior surface of the cylindrical housing is provided with a recess for receiving a container of processing liquid which is to be attached to the roll of film, subsequent to exposure thereof, for processing of the latent images therein.

6 Claims, 6 Drawing Figures

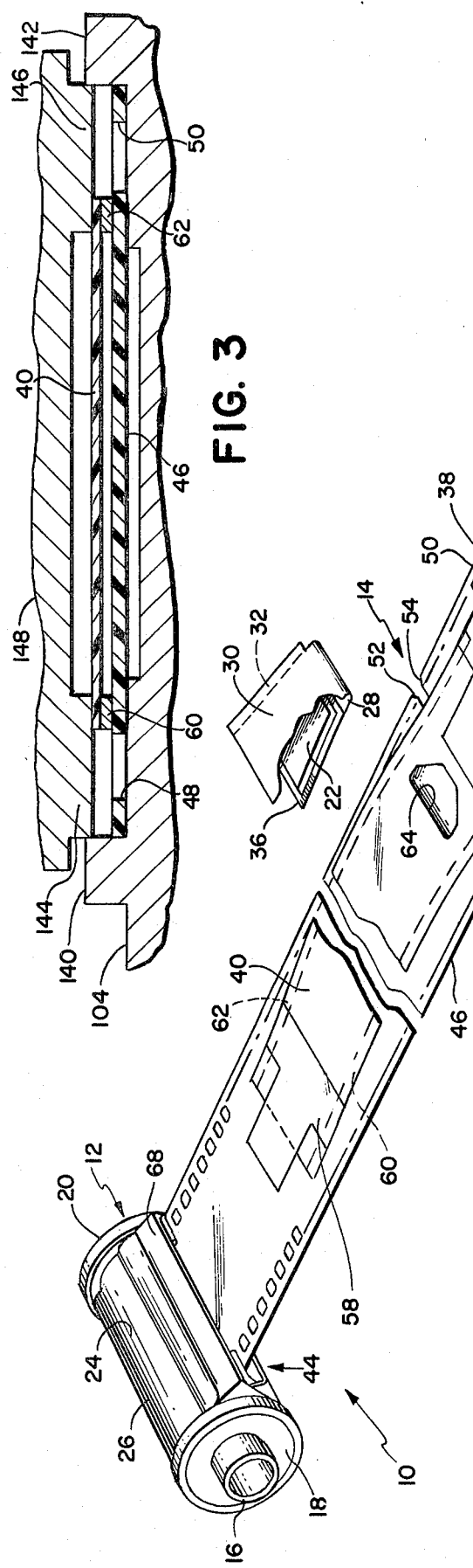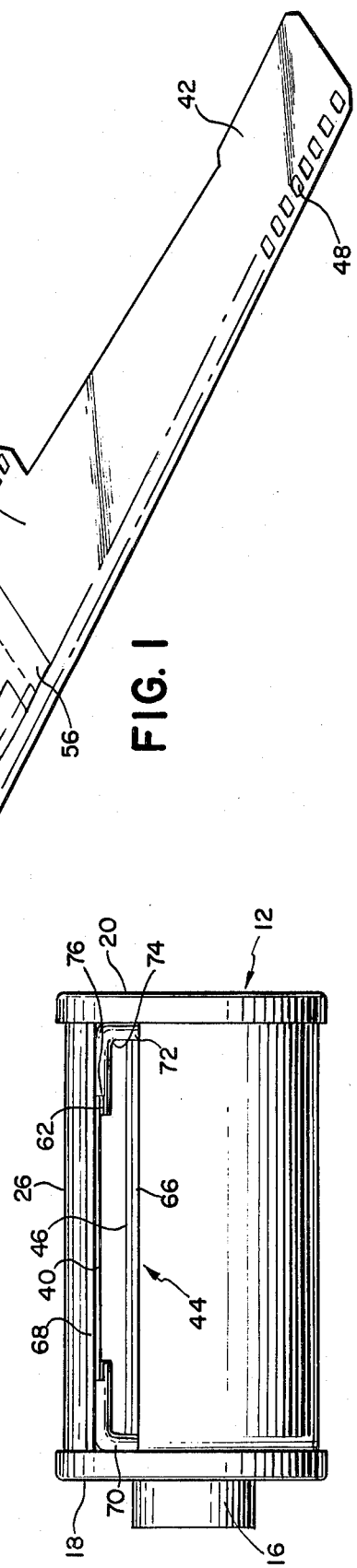

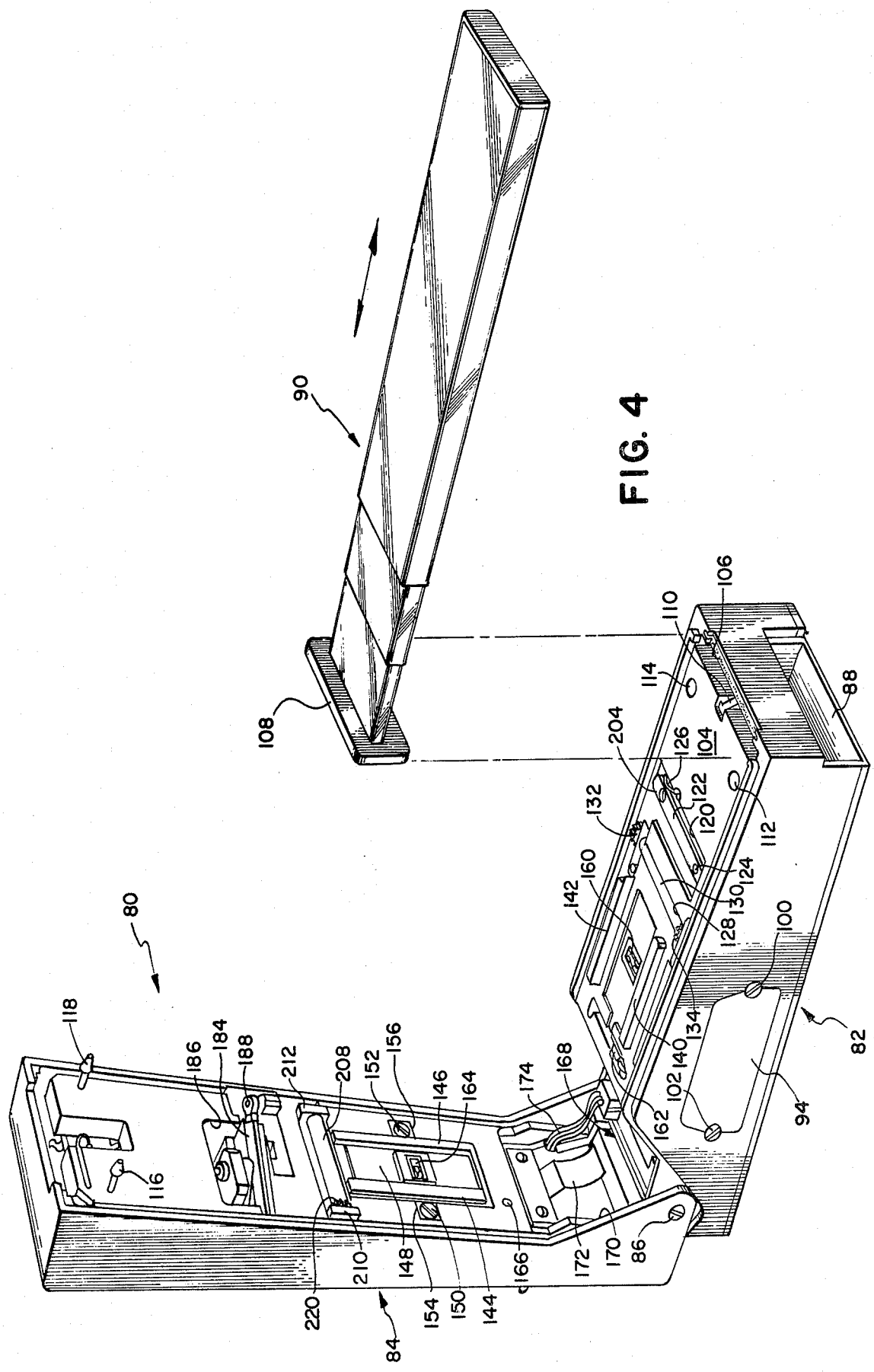

1

PHOTOGRAPHIC FILM ASSEMBLAGE

RELATED APPLICATIONS

This application is related to application Ser. No. (969,996) entitled "Film Processing Apparatus", filed on even date herewith, by L. Bendoni et al. This application also relates to an improvement over the invention disclosed in application U.S. Pat. No. 4,145,133 filed July 25, 1977 by Richard R. Wareham and entitled "Film Assemblage of the Self-Developing Type Together with Apparatus for Processing Thereof".

BACKGROUND OF THE INVENTION

1. Field of the Invention

This invention relates to a photographic film assemblage of the type including a roll of self-developing or instant type film which is adapted for use in conventional still cameras of the non-instant type.

2. Description of the Prior Art Generally, today's conventional still type cameras, e.g., the multitude of conventional 35 mm cameras presently available, have been limited to use with conventional type film. A few of the cameras do have the adaptability to be used with self-developing or instant type film as well as with conventional film, e.g., see U.S. Pat. No. 3,852,780. However, providing a conventional type camera with this adaptability increases its cost because two camera backs are required in order to take advantage of the availability of the two types of film.

One of the more popular types of conventional film presently available is the 35 mm transparency film. Its popularity is such that its format has been incorporated into the self-developing or instant type of film, as evidenced by U.S. Pat. No. 3,350,990. This latter patent shows an instant or self-developing type camera which is adapted for use with a 35 mm format self-developing film unit of the type having a strippable cover sheet. The cover sheet, which includes a pair of laterally spaced, longitudinally extending rails, is located in superposition with the film unit to control the spreading of a processing liquid therebetween during the processing of the film unit. However, the film cassette and film unit disclosed therein are not structured for use in the standard conventional 35 mm camera.

From the foregoing it can be seen that there is a need for a film assemblage of the type including self-developing film which can be loaded into a conventional still type camera, preferably of the 35 mm type. Such an assemblage should include a film cassette which closely resembles the configuration of the cylindrical film cassette presently used in the conventional 35 mm cameras such that the two film cassettes may be readily interchanged.

SUMMARY OF THE INVENTION

The instant invention relates to a photographic film assemblage of the type including a roll of self-developing type film which is adapted for use with conventional type still cameras, preferably those of the 35 mm type. The film assemblage includes a generally cylindrical film cassette having a light sealed opening, a spool rotatably supported within the film cassette, a container of processing liquid, and a composite film structure including a roll of self-developing or instant type film, preferably of the type shown and described in U.S. Pat. No. 3,894,871, and a superposed cover sheet. The cylindrical film cassette is provided with a recess in its outer surface for receiving the pod of processing liquid. While this feature of separating the supply of processing liquid from the remainder of the film assemblage is generally well known in the art, as evidenced by U.S. Pat. Nos. 3,270,642 and 3,200,726, it is important that it, the container, be so related to the film cassette so as to provide an assemblage having an overall external configuration similar to the type of film cassette presently used in conventional 35 mm cameras. Accordingly, the depth of the recess is at least equal to the thickness of the container of processing liquid, and preferably is equal to the thickness of the pod thereby maximizing the volume of the container. The composite film structure includes a first sheet of photosensitive material having a first end secured to the spool, an intermediate section having a given length sufficient to accommodate the sequential recording thereon of a plurality of discrete subject images, preferably ten, and a second end which is adapted to extend through the light sealed opening. A plurality of sprocket holes is provided along the longitudinal margins of the first sheet for cooperating with a sprocket wheel in a camera to unwind the composite film structure during exposure of the given length. The composite film structure includes a second transparent sheet secured to the first sheet at opposite ends of the given length. The second sheet is specifically structured to function as a means for facilitating the spreading of the contents of the container of processing liquid between the two sheets and includes a pair of longitudinally extending, laterally spaced opaque rails for determining the thickness of the layer of processing liquid.

After the given length of film has been exposed in a conventional 35 mm camera, the composite film structure is rewound upon the spool unit only the second end of the first sheet is located exteriorly of the cylindrical film cassette. The film cassette is then removed from the camera and the container of processing liquid removed from the recess in the exterior surface of the film cassette. The film cassette is placed within a small, compact, portable processor and the container of processing liquid is attached to the second sheet such that the discharge end of the container is located between the first and second sheets. Next, the second end of the first sheet is inserted into the open end of an elongate linear dark chamber connected to the processor and the processor is closed thereby locating a roller on each side of the composite film structure. A processing cycle including a timing circuit is then started to connect one of the rollers to a motor thereby causing the rollers to drive the composite film structure from the film cassette and into the dark chamber while simultaneously rupturing the container of processing liquid and spreading its contents between the first and second sheets to initiate the formation of visible images in the first sheet. The processor is provided with means for stopping the drive to the roller after the given length of the first sheet has been driven through the rollers. At the end of the timing cycle, a film cutting mechanism is manually actuated to sever the processed section of the composite film structure from the remainder of the structure. Also, at this time the processing liquid has penetrated the first sheet sufficiently such that the processor may be opened and the processed composite film structure removed from the dark chamber without fear that the ambient light will further expose or fog the first sheet. The discrete subject images of the processed strip may then be severed and individually mounted for subsequent viewing.

An object of the invention is to provide a photographic film assemblage including a cylindrical film cassette having a sheet of photosensitive self-developing film coiled therein with means for mounting a container of processing liquid to the cassette in a manner which will not interfere with the use of the assemblage in a camera of the non-instant or conventional type.

Another object of the invention is to locate a container of processing liquid in a photographic film assemblage of the self-developing type, which is especially adapted for use with non-self-developing type cameras, so as to maximize its volume.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 1 is a perspective view of the photographic film assemblage of the instant invention showing an elongate composite film structure partially withdrawn from a cylindrical film cassette and a container of processing liquid spaced from its operative position relative to the composite film structure;

FIG. 2 is an enlarged elevational view of the cylindrical cassette shown in FIG. 1;

FIG. 3 is an enlarged cross-sectional view of the elongate composite film structure located between the edge controls of a processor;

FIG. 4 is a perspective view of a processor including an extensible dark chamber for use in processing the composite film structure;

DETAILED DESCRIPTION OF THE INVENTION

Figures 5, 6:
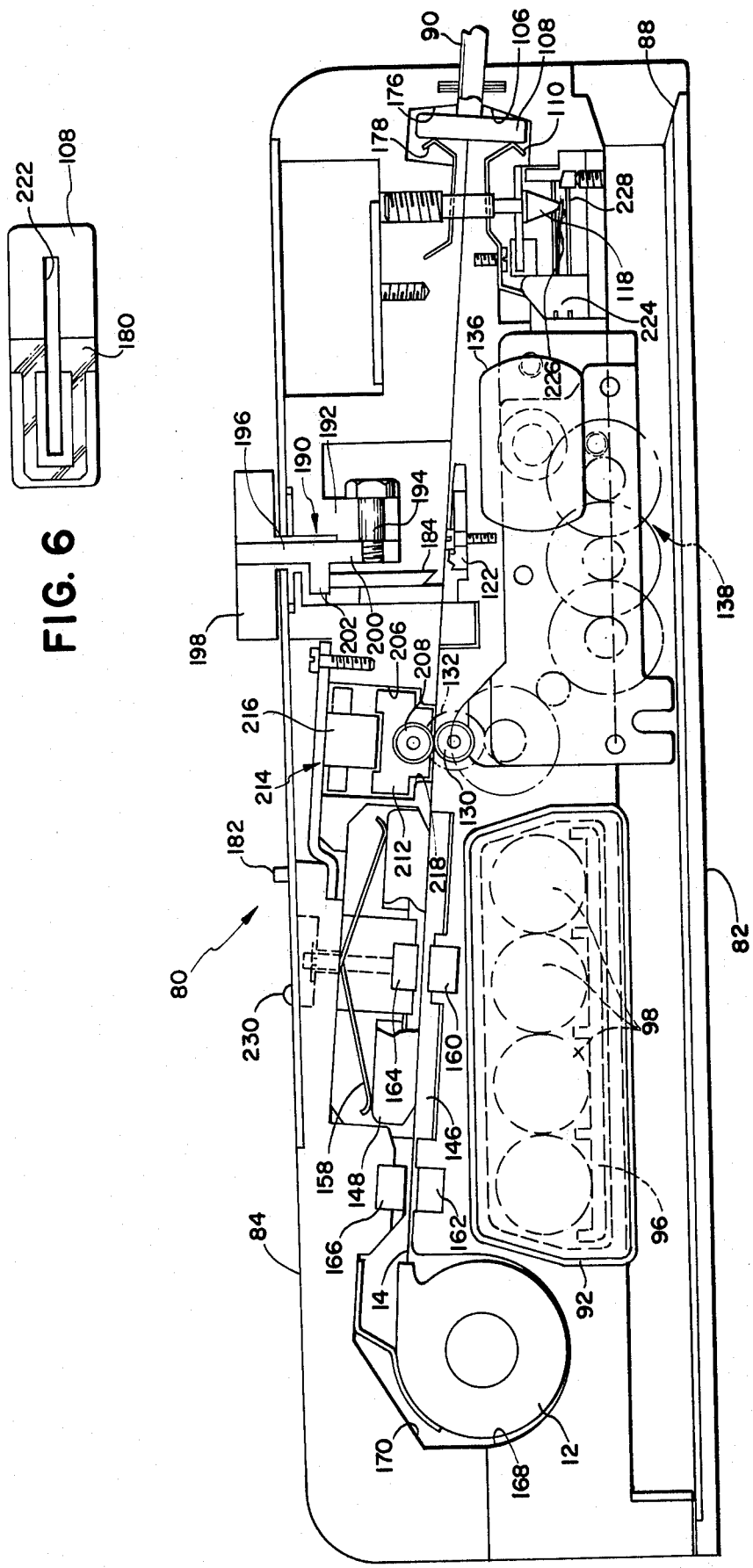
FIG. 5 is a side elevational view, with portions removed, of the processor of FIG. 5.
FIG. 6 is an end view of the dark chamber shown in FIG. 4.

Reference is now made to FIG. 1 of the drawings wherein is shown a photographic film assemblage 10 especially adapted for use in conventional, non-instant type 35 mm cameras. The film assemblage 10 includes a film cassette 12 having a generally cylindrical configuration, an elongate composite film structure 14, a spool 16 rotatably supported within apertures in the end walls 18 and 20 of the cassette 12, and a container 22 of processing liquid.

The cylindrical film cassette 12 is provided with a recess 24 in its exterior surface for storing the container 22 of processing liquid until it is needed for the processing of the elongate composite film structure 14. The container 22 is originally located within the recess 24 such that its long or longitudinal measurement runs parallel with the axis of rotation of the spool 16 and its short or lateral measurement is maintained in a large radius arc which closely conforms with circumference of the main body 26 of the film cassette 12. The depth of the recess 24 is substantially equal to the thickness of the container 22. Attached to one longitudinal end 28 of the container 22 is a member 30 having adhesive strips 32 running along longitudinal edges thereof. When the container 22 is located within the recess 24, the member 30 overlies the container 22 and is releasably secured to opposite sides of the recess 24 by the adhesive strips 32 thereby maintaining the gentle bend in the container in conformance to the curving contour of the main body 26. So located, the general overall configuration of the film assemblage 10 closely approximates that of the conventional film cassette presently used in non-instant 35 mm cameras, e.g., a Minox 35 EL manufactured by Minox GmbH of Lahnstadt 1, West Germany. Accordingly, the film cassette 12 may be easily substituted for the conventional cassette thereby releasing the conventional 35 mm camera from its restraint to use with only conventional film, i.e., non-self-developing type film.

The positioning of the container 22 of processing liquid in the external recess 24 of the film cassette 12 offers many advantages in comparison to locating it within the film cassette. One advantage is that since the normally flat container 22 need only be wrapped around a curved surface having a relatively large radius when it is located within the recess 24, it can hold a much greater volume of processing liquid as compared with a container located within the film cassette which would have to be wrapped around a surface having a shorter radius. One reason for this is that the bending or curving of the walls of the container 22 generally result in an increase in the pressure of the processing liquid. If the pressure builds to a point above that needed to rupture the sealed end 36 of the container 22, the processing liquid will be prematurely released from the container 22. Another advantage in locating the container 22 in the external surface of the film cassette is that it provides more latitude in when the container 22 can be added to the assemblage 10 during the assembly thereof. Still further, if, during a quality control test on the assembly line, the processing liquid within the container is found to be not compatible with the composite film structure located within the film cassette, it, the container, may be readily replaced by one containing the correct processing liquid without opening the film cassette and possibly fogging the composite film structure. However, if the container were located within the film cassette care must be taken not to expose the composite film structure during such exchange of containers.

The composite film structure 14 includes first and second sheets 38 and 40, respectively. The first sheet is a self-developing or instant type film, preferably of the type shown and described in U.S. Pat. No. 3,894,871. The first sheet 38 includes a first end (not shown) which is attached to the spool 16, a second end 42 which is adapted to extend through a light sealed opening 44 in the film cassette 12 so as to be connectable with a take-up sprocket wheel in a camera, and an intermediate portion 46 of a given length extending between the first and second ends upon which a plurality of discrete subject images are adapted to be sequentially recorded. Each lateral side of the first sheet 38 is provided with a row 48 and 50 of apertures which are adapted to receive the sprockets of a sprocket wheel in a camera for withdrawing the major portion of the elongate composite film structure 14 from the film cassette 12. The row 50 is provided with a recessed edge section 52 for preventing the second end 42 from being wound into the film cassette 12. In effect, when the row 50 is notched, as at 52, the corner 54 of the sheet 38 has a natural tendency to misalign itself with the exit slot 44 during rewinding of the elongate composite film structure 14 into the film cassette 12.

The second sheet 40 is formed from any suitable transparent material and is suitably attached at its ends to the first sheet 38 by adhesive tapes 56 and 58. A pair of opaque, longitudinally extending, laterally spaced rails 60 and 62 are secured to the underside of the second sheet 40 so as to provide a minimum spacing between the second sheet 40 and the intermediate portion 46 of the first sheet 38 during the spreading of processing liquid therebetween. The rails 60 and 62 also function during the spreading operation to prevent the processing liquid from leaking at the longitudinal edges of the second sheet. The second sheet 40 is also provided with an aperture 64 which is adapted to receive the container 22 just prior to the processing of the composite film structure. The container 22 is inserted into the aperture 64, discharge end 36 first, such that the container 22 lies between the second sheet 40 and the intermediate section 46 with the discharge end 36 facing the film cassette 12; and the member 30 lies on the upper surface of the second sheet 40 in superposed relation to the container 22. The adhesive strips 32 adhere to the upper surface of the second sheet so as to maintain the container 22 in position. At this point, it should be noted that the length of the second sheet 40 is greater than the length of the intermediate portion 46 which it overlies so as to compensate for the added distance that it, as the outer layer in a convolution, must travel relative to the underlying intermediate portion 46.

The first and second sheets 38 and 40 are maintained in proper alignment with each other during the winding and unwinding of the elongate composite film structure 14 about the reel 16 by a guide means located immediately adjacent the light sealed opening 44 in the film cassette 12. The opening 44 is defined in part by a pair of outwardly extending parallel flanges 66 and 68. A pair of guides 70 and 72 extend upwardly from the flange 66 and then inwardly toward each other. Each guide includes a first recessed portion 74 and a second recessed portion 76. The horizontal distance between the first recessed portions 74 is approximately equal to the width of the intermediate portion 46 of the first sheet 38 and the horizontal distance between the second recessed portions 76 is approximately equal to the width of the second sheet 40.

The film assemblage 10 is loaded into a conventional 35 mm camera and the second end 42 of the elongate composite film structure 14 is attached to the sprockets of the camera's sprocket wheel. The camera's film loading door is closed and the sprocket wheel is rotated to advance the elongate composite film structure 14 from the film cassette 12 until the first frame of the intermediate section 46 is located in position for exposure. The film is exposed with the lower surface (as viewed in FIG. 3) of the intermediate section facing the objective lens. After exposure, the remaining frames are sequentially advanced into their exposure position until all of the given length of the intermediate section 46 has been exposed. The user then rotates a film rewinding knob to rewind the elongate composite film structure 14 on the spool 16, the rewinding operation terminating when the user feels the increased tension on the knob caused by the corner 54 of the first sheet 38 getting hung up on one of the flanges 66 or 68 at the light sealed opening 44. The film assemblage 10 is then removed from the camera and placed in a small compact easy to use processor 80 for immediate processing of the latent images in the given length of the intermediate section 46, i.e., the length between the points of attachment of the second sheet 40 to the frist sheet 38.

The processor 80 includes first and second housings 82 and 84 pivotally connected at 86 to each other for movement between an inoperative, film loading position, as shown in FIG. 4, and an operative film processing position, as shown in FIG. 5, wherein they form a lighttight enclosure for the composite film structure 14. The first housing 82 includes an elongate recess 88 for storing an extendible dark chamber 90 and a battery compartment 92 for slidably receiving a battery tray 94. The battery tray 94 includes a horizontal support 96 (see FIG. 5) for receiving a plurality of batteries 98. The tray 94 is secured in place by any suitable means such as by the heads of a pair of screws 100 and 102. A top wall 104 of the first housing 82 includes a recess 106 for receiving the bottom half of a flange 108 located at the open end of the dark chamber 90. Mounted within the recess 106 is an electrical contact 110 which forms one part of a switch to be described later. A pair of holes 112 and 114 are located adjacent to the recess 106 for receiving a pair of latch pins 116 and 118, respectively, located on the second housing 84. Suitable means are located within each hole 112 and 114 for releasably locking onto the enlarged head portions of the pins 116 and 118 when the housings 82 and 84 are in the position shown in FIG. 5. The surface 104 is provided with a second recess 120 for receiving a cutting blade 122. The blade 122 is pivotally mounted within the recess 120 by a pin 124 and is biased in a counterclockwise direction against a stop (not shown) by a spring 126. To the left of the recess 120 is still another recess 128 for receiving an elongate spread roller 130 having a gear 132 mounted on one end thereof and a gear 134 mounted on the opposite end thereof. The spread roller 130 is adapted to be driven by a motor 136 through a gear train 138.

The processor 82 includes means for cooperating with the rails 60 and 62 on the second sheet 40 for preventing the processing liquid from leaking at the edges of the sheet 40 during the spreading of the liquid. Specifically, these means include a pair of laterally spaced ribs 140 and 142 which extend upwardly from the top wall 104. The ribs 140 and 142 are spaced from each other by a distance substantially equal to the width of the intermediate section 46 of the first sheet 38, and are adapted to receive therebetween a pair of ribs 144 and 146 extending downwardly from a plate 148 mounted in the second housing 84, as best seen in FIG. 3. The plate 148 is secured to the second housing 84 by a pair of screws 150 and 152 which extend through a pair of arms 154 and 156 extending outwardly from the plate 148. Each of the screws 150 and 152 is threaded only at its end section so as to enable the unthreaded portions to guide the plate in a vertical direction, as viewed in FIG. 5, under the influence of a spring 158.

As seen in FIG. 4, a pair of light emitting diodes 160 and 162 are mounted within the top wall 104. The diode 160 is located intermediate the ribs 140 and 142 while the diode 162 is located slightly out of alignment with the rib 140. A pair of diode detectors 164 and 166 are mounted within the housing 84 such that when the housings 82 and 84 are in the positions shown in FIG. 5 the detector 164 overlies the diode 160 and the detector 166 overlies the diode 162. The diodes 160 and 162 and their respective detectors 164 and 166 are incorporated into the processor's electrical circuit (not shown) to insure proper operation of the processor 82 during operation thereof.

The end of the first housing 82 includes a recess 168 which cooperates with a recess 170 in the second housing 84 to define a chamber for receiving the film cassette 12. A leaf spring 172 is mounted within the recess 170 for maintaining the film cassette 12 in position during the processing of the composite film structure 14. Also, a plurality of wires 174 extend from the recess 168 into the recess 170 for electrically inter-connecting the circuit components in the first housing 82 with those located within the second housing 84.

The second housing 84 includes a recess 176 for receiving the top half of the flange 108 of the dark chamber 90. Mounted within the recess 176 is an electrical contact 178. When the flange 108 is located within the recesses 106 and 176, as shown in FIG. 5, the electrical contacts 110 and 178 are in engagement with a strip of electrically conductive material 180 located on the face of the flange 108, see FIG. 6, thereby forming a closed switch in the processor's circuit when it is connected with the batteries 98. The contacts 110 and 178 and the strip 180 function as a switch located in series connection with the motor 136 thereby insuring that the motor 136 cannot be electrically coupled to the batteries 98 by actuating a processing start button 182 unless the dark chamber is properly coupled to the first and second housing 82 and 84.

The cutting blade 122 is complemented by a second cutting blade 184 located within a recess 186 in the second housing 84. The blade 184 is pivotally coupled at 188 to the second housing 84 and is provided with a spring (not shown) for urging the blade 184 into the recess 186. A bell crank 190, see FIG. 5, is pivotally coupled to a flange 192 by a bolt 194. One leg 196 of the crank 190 extends to the exterior of the second housing 84 where it is provided with a manually actuatable handle 198. The other leg 200 of the crank 190 includes a section 202 which is located in engagement with the top surface of the free end of the cutting blade 184. As viewed in FIG. 5, movement of the handle 198 towards the viewer results in the section 202 moving the blade 184 into cutting relation with the blade 122 thereby severing the film located therebetween. As the second housing 84 is moving into closing relation with the first housing 82, the pivoted end 188 moves into engagement with an inclined surface on the terminal free end 204 of the blade 122. If the alignment of the blades 122 and 184 relative to each other is slightly off, the pivoted end 188 will engage the free end 204 to rotate it slightly against the bias of the spring 126.

The second housing 84 is provided with still another recess 206 for receiving a spread roller 208. The ends of the roller 208 are rotatably supported in a pair of T-shaped bearing blocks 210 and 212 for vertical movement, as viewed in FIG. 5, toward and away from the spread roller 130. A spring strap 214 is mounted intermediate its arms within the recess 206 such that each of its arms (only one being shown in FIG. 5) 216 bear against the bearing blocks 210 and 212 to urge them into engagement with a narrowed portion 218 at the lower end of the recess 206. A gear 220 is secured to one end of the spread roller 208 whereby the rotation of the spread roller 103 is transferred to the spread roller 208 via the gears 134 and 220.

Prior to processing the exposed intermediate section 46 of the film assemblage 10, the dark chamber 90 is removed from the elongate recess 88 and extended to its fullest extent, approximately 54 centimeters. The dark chamber 90 is then attached to the first housing 82 by inserting the lower half of the flange 108 into the recess 106. The container of processing liquid 12 is removed from the film cassette 12 and the latter is then placed in the recess 168 and the composite film structure 14 laid along the top surface 104 of the first housing 82 such that the second end 42 of the assemblage 14 extends into the dark chamber 90 via opening 222 and the intermediate portion 46 of the first sheet 88 and the superposed second sheet 40 are located between the rails 140 and 142 with the aperture 64 located to the left of the spread roller 130 and the opaque rail 60 overlies the diode 162. The container of processing liquid 22 is threaded through the aperture 64 such that it overlies the diode 160 and its discharge end 36 is facing the film cassette 12. The container 22 is maintained in place by the contact between the top surface of the second sheet 40 and the adhesive strips 32 on the member 30. The second housing 84 is then moved into the position shown in FIG. 5 thereby enclosing the film assemblage 10 in a light free environment. A normally open electrical switch 224 located in series with the motor 136 is provided for insuring that the motor 136 cannot be started until after the switch 224 is closed by the pin 118 moving a contact 226 into engagement with a contact 228 during the proper latching of the first and second housings 82 and 84 in the closed position. As described previously, the contacts 110 and 178 and the strip of electrically conductive material 180 also function as a closed switch located in series with the switch 224 and with the motor when located in the position shown in FIG. 5. Further, the detector 166 functions to open a normally closed switch located in series with the above two switches and with the motor 136 when the illumination of its respective LED 162 strikes it; while the detector 164 functions to latch a switch, located in series with the other switches, in a closed position if it does not see the initial illumination of the LED 160. This latter switch remains latched in a closed position until the timing circuit ends. Next, the button 172 is depressed to initiate a processing cycle. Depression of the button 182 normally results in a timing circuit being energized, the diodes 160 and 162 being illuminated, and the motor 136 being electrically coupled to the batteries 98 thereby driving the spread roller 130 in a clockwise manner. However, if certain conditions are not met, the motor 138 will not be connected to the batteries 98. These conditions are: (1) the two housings 82 and 84 must be securely latched in the closed position thereby closing the normally open switch 224; (2) the dark chamber 90 must be in position thereby closing the switch comprised of contacts 110 and 178 and the electrically conductive strip 180, which switch is in series with the motor 136; (3) the container 22 of processing liquid must be located between the diode 160 and the detector 164 such that when the diode 160 is illuminated by the depression of the button 182, its illumination does not strike the detector 164; and (4) the opaque rail 60 is located over the diode 162 thereby preventing its illumination from striking the receptor 166. With all of the above four conditions met, the motor 136 is energized to drive the spread rollers 130 and 208 to drive the composite film structure 14 to the right into the dark chamber 90. Initial movement of the composite film structure 14 moves the container 22 into the bite of the rollers 130 and 208 which, in turn, apply a pressure to the container 22 to rupture its end 36. The rollers 130 and 208 spread the contents of the container between the first and second sheets 38 and 40 so as to initiate the formation of visible images within the first sheet 38 while simultaneously advancing the liquid treated portions into the dark chamber 90. The length of the opaque rail 60 is selected such that its end moves out from between the diode 162 and its detector 166 just subsequent to the trailing end of the intermediate portion 46 passing through the rollers 130 and 208. When the end of the opaque rail 60 moves out of covering relation with the diode 162, the illumination of the diode 162 strikes the detector 166 which, in turn, opens its associated switch thereby disconnecting the motor 136 from the batteries 98. The liquid treated composite film structure 14 remains within the light free environment of the processor 80 and the dark chamber 90 until the aforementioned timing circuit ends, as indicated by a bulb 230 turning off. At this time, the processing liquid has imbibed the first sheet 38 for a period of time sufficient to enable it to be exposed to the ambient light without fear of it being adversely fogged or further photographically exposed. Further, the processing liquid has dried to the extent that it forms a permanent bond between the first and second sheets 38 and 40, respectively. The handle 198 may now be actuated to pivot the blade 184 downwardly thereby severing the intermediate portion 46 and the superposed second sheet 40 from the remainder of the composite film structure 14. The severed portion of the composite film structure 14 containing the visible images may now be removed from the processor 80 and the dark chamber 90 and the individual images severed and mounted for subsequent viewing.

Since certain changes may be made in the above described invention without departing from the scope thereof, it is intended that all matters contained in the above description or shown in the accompanying drawings shall be interpreted as illustrative and not in a limiting sense.

What is claimed is:

1. A photographic film assemblage for use with commercially available still picture cameras having means for operably locating a single reel cassette of film of the non-self-developing type which is adapted to have sequentially photographically recorded thereon a plurality of discrete subject images when utilized in such cameras and which has a generally cylindrical housing of a given diameter and a given length with an elongate light sealed opening extending therethrough, a spool mounted within the cylindrical housing for rotation about an axis extending lengthwise of the cylindrical housing and including a central portion around which an elongate strip of non-self-developing type film is coiled with one end thereof extending through the light sealed opening, said photographic film assemblage comprising:

a generally cylindrical housing of substantially said given diameter and said given length, said cylindrical housing including means defining a recess of a given depth in an exterior surface thereof for receiving a container of processing liquid and means defining an elongate light sealed opening extending lengthwise thereof;

support means mounted within said cylindrical housing for rotation about an axis extending lengthwise of said cylindrical housing;

an elongate composite film structure including a first sheet of unprocessed photosensitive self-developing type film having a given length sufficient to accommodate the sequential recording thereon of a plurality of discrete subject images and a second sheet secured in superposed relation to at least said given length of said first sheet, said composite film structure being coiled around said support means with a first end thereof secured to said support means and with a second end thereof extending through said elongate light sealed opening; and a container of processing liquid adapted to be temporarily releasably secured within said recess, said container having a depth or thickness no greater than said given depth of said recess.

2. A photographic film assemblage as defined in claim 1 further including means for mounting said container on one of said first and second sheets subsequent to the exposure of said given length so as to enable its contents to be distributed therebetween to initiate the formation of a visible image in one of said first and second sheets.

3. A photographic film assemblage as defined in claim 2 where the visible image is formed in said first sheet.

4. A photographic film assemblage as defined in claim 3 wherein said first sheet is of a width greater than that of said second sheet and said first sheet includes means defining a row of apertures along longitudinal edges thereof for receiving a portion of a film advancing apparatus.

5. A photographic film assemblage as defined in claim 4 wherein one of said rows of apertures is provided with a recessed edge section for preventing said second end of said elongate composite film structure being advanced into said cylindrical housing.

6. A photographic film assemblage as defined in claim 4 wherein said light sealed opening includes first and second means for engaging the longitudinal edges of said first and second sheets, respectively, for maintaining a predetermined relationship between said first and second sheets during the simultaneous movement of the latter out of and into said cylindrical housing.

* * * * *